April 30, 1968   J. L. WATERS ET AL   3,381,197
MOTOR SPEED RESPONSIVE ARRANGEMENT FOR
CONTROLLING MOTOR WINDING CIRCUITS
Filed Feb. 24, 1965   5 Sheets-Sheet 1
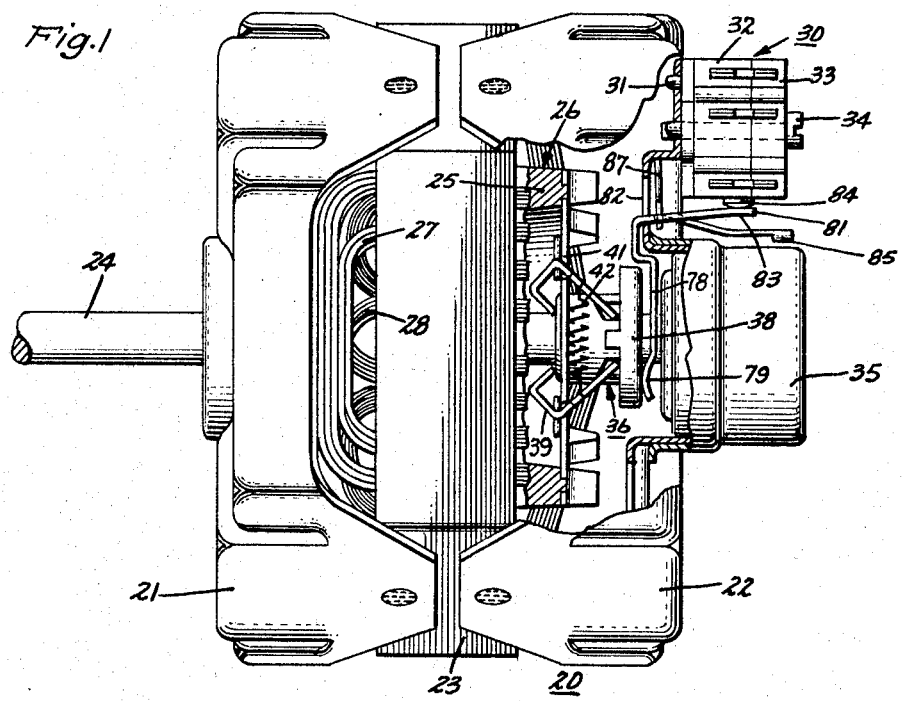
Fig.1
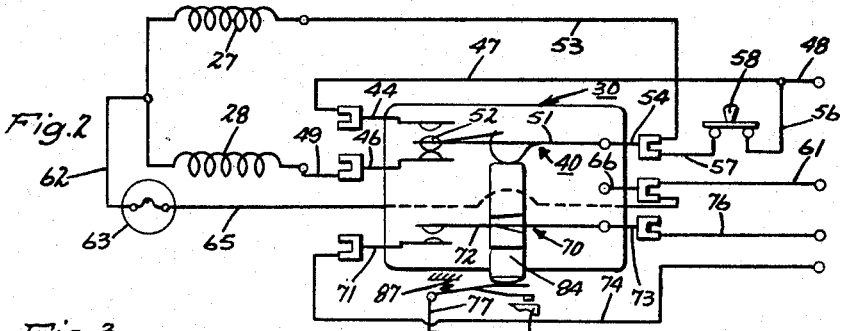
Fig.2
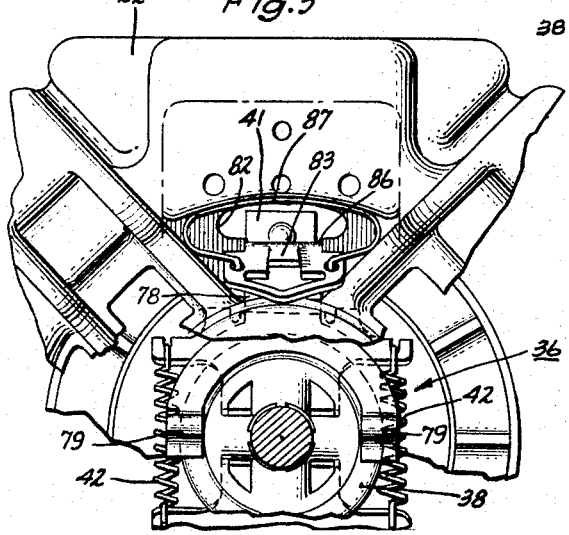
Fig.3
Fig.4
Inventors:
James L. Waters,
John L. Slonneger,
by John L. Stoudt
Attorney April 30, 1968 J. L. WATERS ETAL 3,381,197
MOTOR SPEED RESPONSIVE ARRANGEMENT FOR
CONTROLLING MOTOR WINDING CIRCUITS
Filed Feb. 24, 1965 5 Sheets-Sheet 2
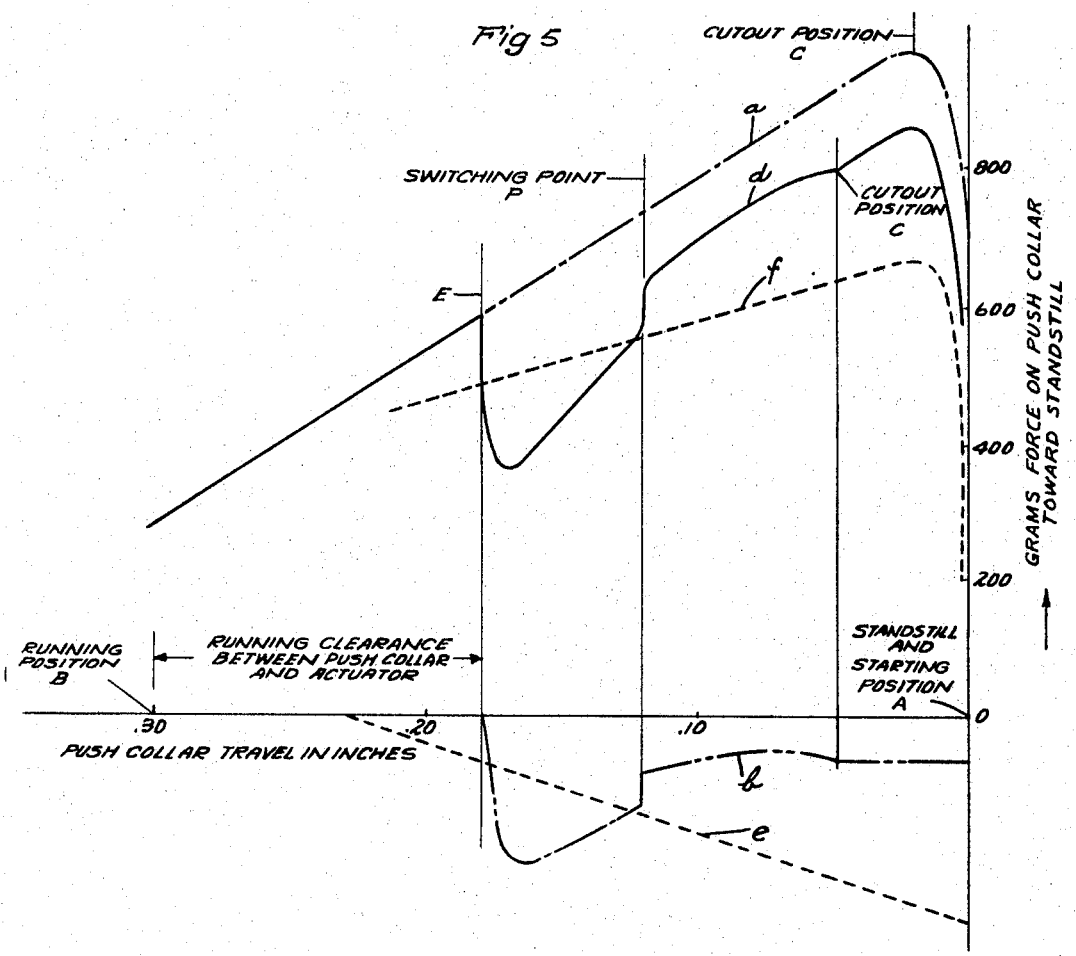
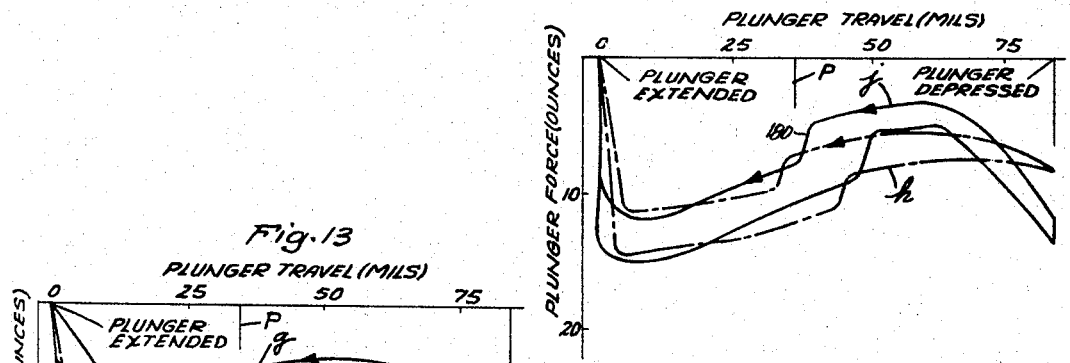
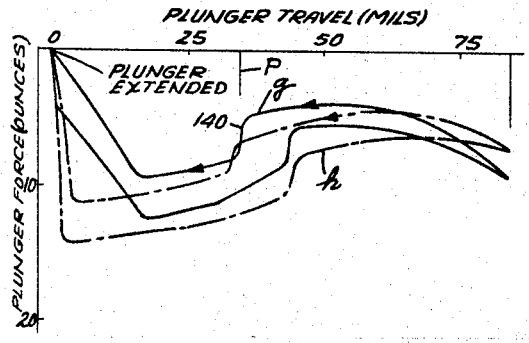
Inventors:
James L. Waters,
John L. Slonneger,
by John M. Staudt
Attorney.

April 30, 1968 J. L. WATERS ETAL 3,381,197
MOTOR SPEED RESPONSIVE ARRANGEMENT FOR
CONTROLLING MOTOR WINDING CIRCUITS
Filed Feb. 24, 1965 5 Sheets-Sheet 3
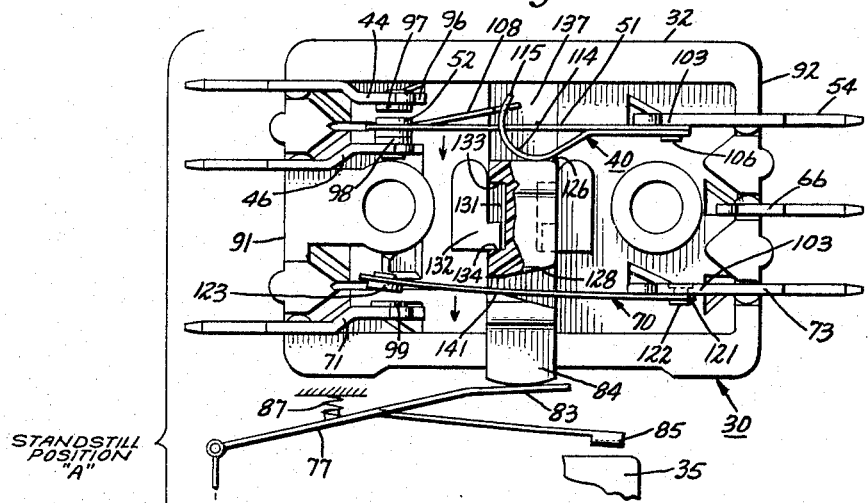
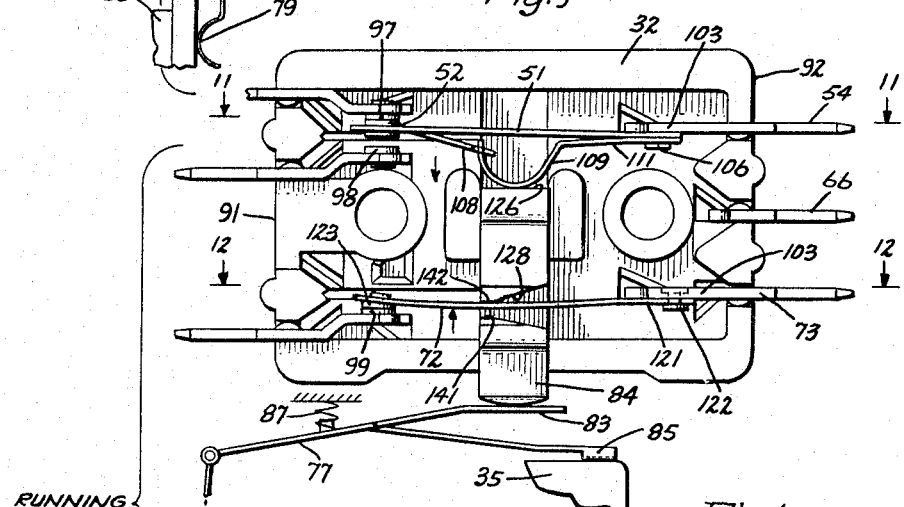
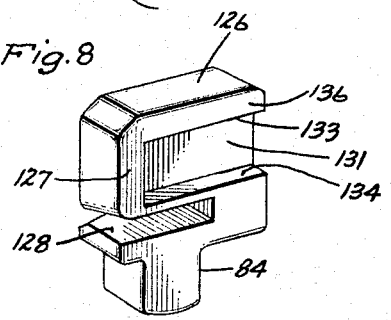
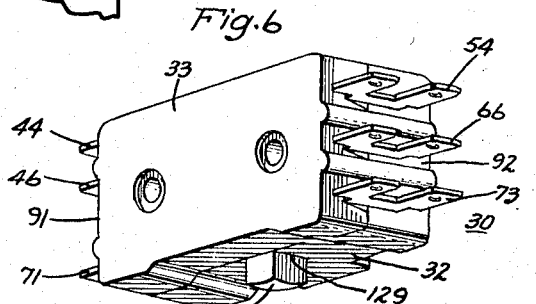
Inventors:
James L. Waters,
John L. Slonneger,
by John M. Stoudt
Attorney April 30, 1968 J. L. WATERS ETAL 3,381,197
MOTOR SPEED RESPONSIVE ARRANGEMENT FOR
CONTROLLING MOTOR WINDING CIRCUITS
Filed Feb. 24, 1965 5 Sheets-Sheet 4
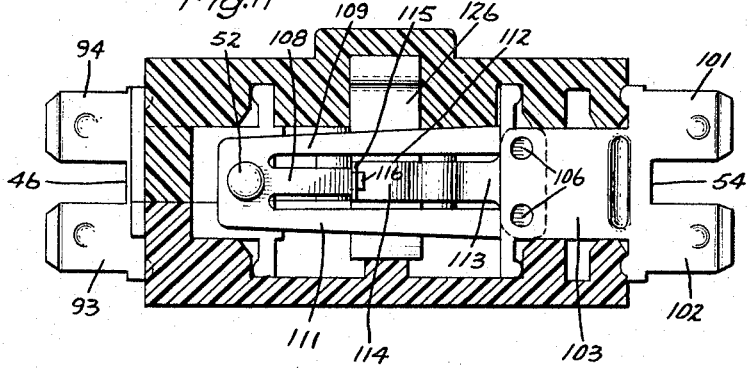
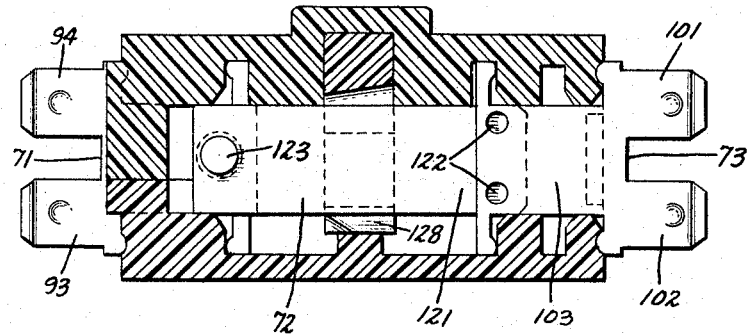
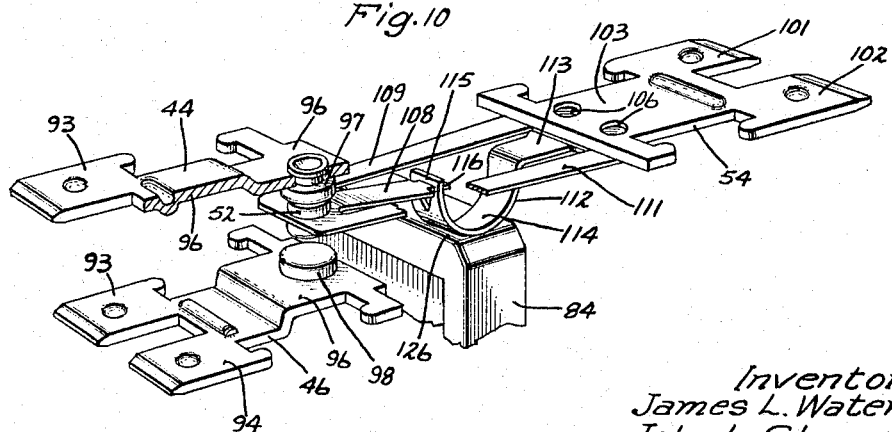
Inventors:
James L. Waters,
John L. Slonneger,
by John M. Stoudt
Attorney

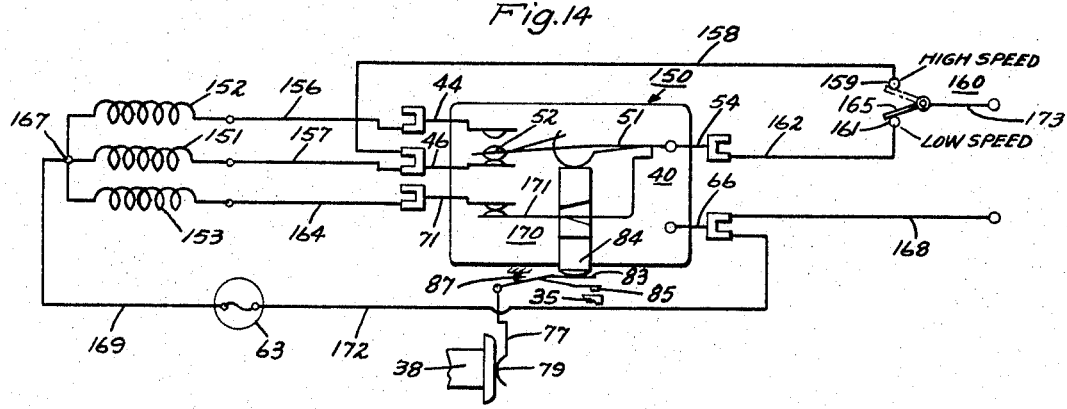
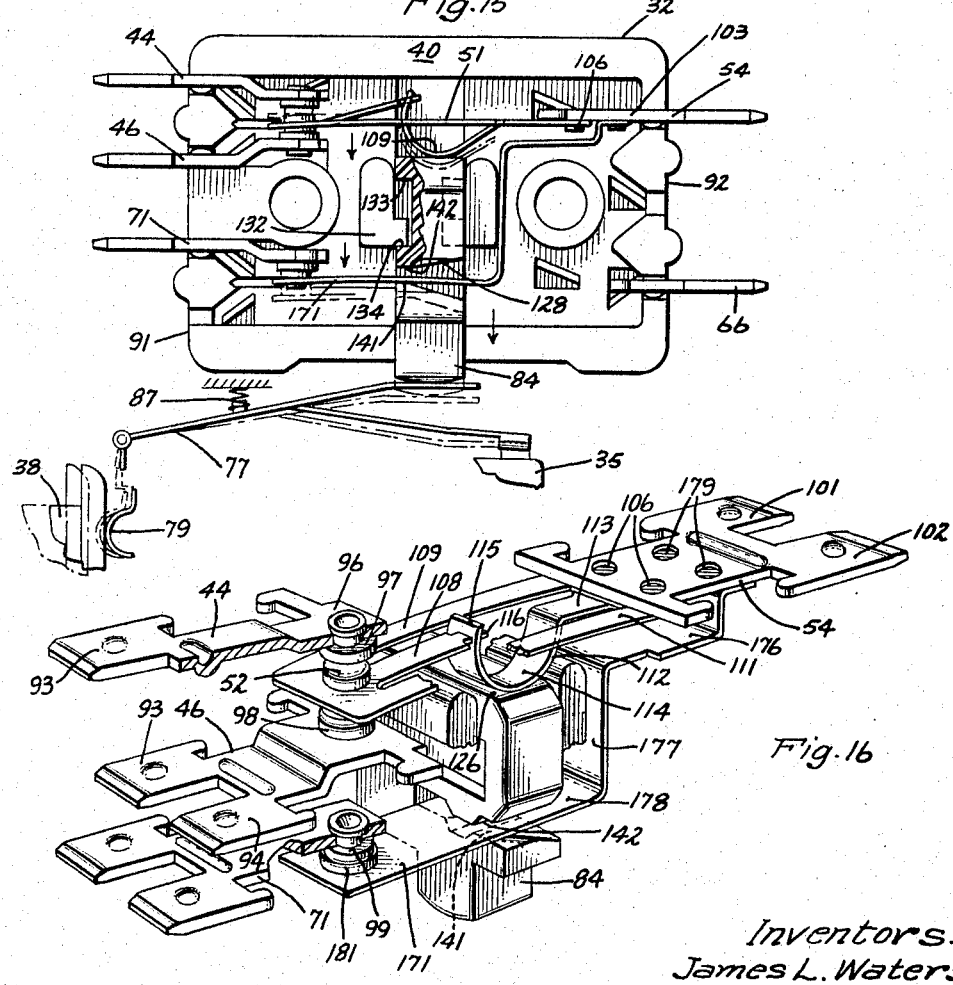

3,381,197
**MOTOR SPEED RESPONSIVE ARRANGEMENT FOR
    CONTROLLING MOTOR WINDING CIRCUITS**
James L. Waters, Malta, and John L. Slonneger, Morrison,
   Ill., assignors to General Electric Corporation, a corporation of New York
           Filed Feb. 24, 1965, Ser. No. 434,769
              11 Claims. (Cl. 318—221)

ABSTRACT OF THE DISCLOSURE

A centrifugal switch and an axially movable speed responsive mechanism in a motor wherein the switch resists recycling during periods of temporary machine speed pulsations, such as might occur as the start winding is removed from the winding circuit when the motor has reached running speed. Springs bias a push collar toward a standstill position and the characteristics of the switch and a linkage operatively connecting the collar and the switch together provide a combined net force in the direction of the run position having an overall non-linear characteristic which produces an abrupt increase of net resultant force toward the run position as the switch operates.

Background of the invention

The present invention relates to dynameolectric machines and more specifically to an improved speed responsive arrangement or system capable of selectively controlling motor starting and other circuits in response to the change in speed of motor operation.

For those dynamoelectric machine applications where high starting torque per ampere is extremely important for a given size machine, such as domestic motor application, including typewriters, dishwashers, automatic dryers and other appliances, it has been customary to construct the motor with at least one main excitation or running winding and a start winding. A single phase, split phase induction motor is an example in which the windings are carried by the motor stator physically displaced one from the other. This structure produces a space phase in the respective winding currents, which are also conventionally displaced in time phase by use of such circuitry as resistors, capacitors and the like. Conventionally, the starting winding is disconnected from a power source once the motor reaches a predetermined operating speed.

One common way of achieving deenergization of the start winding in response to a predetermined motor speed is by a centrifugally operated mechanism, responsive to the motor speed, which in turn opens the switch of a winding control switch unit in the circuit of the start winding when the motor attains the desired operating or running speed. These centrifugal mechanisms are characterized by the provision of weight elements which move under the influence of centrifugal force responsive to the rotational speed of the rotatable members of the motor (e.g. rotor) and urge a so-called push-collar in an axial direction for closing or opening the switch contacts of the switch unit as dictated by motor speed.

In the past, one of the problems encountered with speed responsive arrangements arises from abrupt changes in motor speed which occur during motor operation. These abrupt changes, even though momentary, have a tendency to cause recycling of both the mechanism and the winding control switch, especially troublesome in the operation of multi-speed single phase motors. In studying this problem, we believe we have found several reasons for the abrupt changes in speed. Taking a two-speed motor having a number of windings which selectively produce 4 and 6 pole operation with synchronous speeds of 1800 and 1200 r.p.m. respectively, the motors are normally started utilizing the windings having the four poles. The centrifugal mechanism is actuated at a speed somewhat above 1200 r.p.m. Thus, when the driven load requires change of operation to six poles, the low speed, and the windings are reconnected to achieve this end, torque is absorbed from the driving lead; e.g. mechanical inertia of the rotatable system, a so-called "reverse torque" condition, and the speed of rotation decreases through the cutout speed of the mechanism toward the 1200 r.p.m. synchronous speed. This may cause unnecessary recycling of the mechanism and switch. In addition, depending upon the rapidity of the switching operation, phasing of contacts, and delay in torque build up, it is possible that for a brief period, no positive motor torque will be supplied, permitting motor load reactions to slow the motor speed. The combination of these factors can develop a net reverse torque condition which, for a short duration can pulse the rotating members to as little as half the switching speed of the motor. The reverse torque condition which may occur in single-speed and as well as multi-speed motor applications, regardless of cause, can cause the recycling of both the mechanism and switch. This, in turn, detracts from their ultimate operating life, may produce a welded contact condition for the switch and undesirable or objectionable switching and mechanism noise.

It is particularly desirable, if not essential that a speed responsive arrangement or system be provided for controlling the energization of a start winding of a motor that is less sensitive to reverse torques encountered in both single-speed and multi-speed motor applications than has been heretofore accomplished in order to prevent, among other things, unnecessary recycling of components. It is further desirable that such be achieved by an arrangement in which the push collar force change during the period of start switch operation, that is, just before switching to a point after its completion, be directed toward the run position of the collar with as great a force as is practical for a given application and motor size. Additionally, these desirable features should be attained with a speed responsive arrangement that is rugged in construction and inexpensive to produce and to install, yet has a long operating life without producing objectionable switching and mechanism noises.

Summary of the invention

It is therefore a primary object of the present invention to provide a dynamoelectric machine with an improved speed responsive system or arrangement and more particularly, an arrangement for a dynamoelectric machine or motor which compensates for reverse torques encountered in single-speed and multi-speed motor applications.

It is a further object of the present invention to provide an improved dynamoelectric machine speed responsive arrangement having the desirable features mentioned above.

It is yet another object of the present invention to provide an improved dynamoelectric machine in which a speed responsive arrangement for controlling the winding circuit provides a net force on the push collar centrifugal mechanism which increase in an overall, generally non-linear fashion as the collar moves between the mechanism cutout and running positions with the force change, at least from a point in time just before switching occurs until shortly after it has been completed, being directed toward the run position, and further provides an abrupt increase in net force generally toward the collar run position during the switching function to permit a reduction in motor speed without causing a recycling of the mechanism and switch.

In carrying out the objects in one form, we provide an improved dynamoelectric machine having at least two windings and a speed responsive arrangement for controlling the winding circuit of the machine. The arrangement includes a mechanism element, responsive to the rotational speed of the rotatable assembly of the machine, with the element being axially movable between an extended or standstill position and a retracted or running position. Spring means are employed to urge the element toward the standstill position. The machine is further provided with a switch unit which is connected to the speed responsive element through a linkage to de-energize the one winding when the rotatable assembly attains a predetermined speed. The switch unit has at least one pair of switch contacts connected in circuit with the one winding and a spring biased snap acting contact arm operates between closed and open contact positions to control the energization of that circuit. During at least part of the axial movement of the element toward the running position, the switch and linkage exert a force on the element in a direction opposing the spring means.

By an important feature of the present invention, the speed responsive arrangement of the machine has a characteristic such that the net resultant force exerted on the element of the speed responsive mechanism includes an abrupt increase in the direction of the running position during operation of the contact arm, with the net resultant force being primarily non-linear over all as the element travels beyond the cutout position to the running position. In addition, during such travel, the net force exerted by the switch unit and linkage preferably decreases at a rate less than the rate of force decrease applied on the element by the spring means.

With the foregoing interrelationships, the speed responsive arrangement resists recycling of the element and switch unit and is less sensitive to reverse torques which might be encountered during motor operation, whether involving a single-speed or multi-speed application. Further, the motor is allowed to slow down to a greater extent, due to switching torque transients, than achieved in prior constructions known to us, without causing the speed responsive system to recycle. These advantages are obtained with a system that is inexpensive to fabricate and assemble, yet one which is capable of a long operating life without producing objectionable switching and mechanism noises.

The subject matter which we regard as our invention is particularly pointed out and distinctly claimed in the concluding of this specification. Our invention, however, both as to organization and method of operation, together with further objects and advantages thereof, may be best understood by reference to the following description taken in conjunction with the accompanying drawings.

*Brief description of the drawings*

FIGURE 1 is a side elevational view of a single phase, split phase type electric motor incorporating one form of the present invention, with a portion of the end frame, rotor and stator members being broken away to show the relative positions of the speed responsive centrifugal switching mechanism and switch actuator components of the machine for operating the winding control switch unit during standstill and starting conditions;

FIGURE 2 is a schematic circuit diagram for the electric motor illustrated in FIGURE 1 depicting the windings, winding control switch unit, the push collar of the centrifugal mechanism and switch actuator components under the same operative conditions shown in FIGURE 1;

FIGURE 3 is an enlarged fragmentary end view showing a part of the switch end for the electric motor of FIGURE 1 with the switch unit removed to reveal details of the spring biased switch actuator and the centrifugal switching mechanism of the first exemplification;

FIGURE 4 is an enlarged rear view of the control switch unit before it has been mounted to the end frame of the motor pictured in FIGURE 1, the view showing that part of the switch housing adapted to seat against the end frame;

FIGURE 5 is a graph showing typical forces on the push collar vs. push collar travel for our new and improved speed responsive arrangement, as contrasted to a conventional speed responsive system not incorporating the present invention;

FIGURE 6 is an enlarged view in perspective of the switch unit of FIGURE 4, with the front and plunger parts being displayed more fully;

FIGURE 7 is a front enlarged elevational view of the control switch of the exemplification and a schematic presentation of the push collar unit and switch actuator, with one of the housing members removed to show the relative positions of the plunger and switch components during standstill or starting, and with the push collar and switch actuator being depicted at a 90 degree angle from their actual locations relative to the switch unit for simplicity of illustration;

FIGURE 8 is a view in perspective of the switch plunger seen in FIGURE 7;

FIGURE 9 is a view similar to that of FIGURE 8, but showing all components in their relative positions under running conditions of the motor;

FIGURE 10 is an enlarged fragmentary view in perspective of the snap-acting switch components of the switch unit and adjacent plunger portion in their relative positions shown in FIGURE 9;

FIGURE 11 is a view taken along line 11—11 in FIGURE 9;

FIGURE 12 is a view taken along line 12—12 in FIGURE 9;

FIGURE 13 illustrates typical plunger force vs. plunger travel curves resulting from the action of the switches incorporated in the switch unit of the exemplification;

FIGURE 14 is a schematic circuit diagram showing a second embodiment of the present invention being applied to a multi-speed single phase, split phase electric motor, with the motor windings, control switch unit, including the plunger, push collar and switch actuator illustrated in their standstill or starting relative positions;

FIGURE 15 is a front elevational view of the control switch unit schematically revealed in FIGURE 14, with one of the housing members to illustrate switch details and their operative relation, as well as the cooperating push collar and switch actuator components of the winding control speed responsive arrangement;

FIGURE 16 is a fragmentary view in perspective of components for the switch unit seen in FIGURE 15; and FIGURE 17 illustrates a typical plunger force-plunger travel curves resulting the action of the switches provided in the unit of FIGURES 14, 15 and 16.

*Description of the preferred embodiments*

Referring now to the drawings in more detail, and in particular to FIGURES 1–13 inclusive, one form of our invention is illustrated in connection with a speed responsive arrangement incorporated in a dynamoelectric machine of the single speed, single phase induction type motor 20. In the exemplification shown in FIGURE 1, a pair of end shield or frame assemblies 21, 22 are suitably secured to a stator 23 and support a shaft 24 mounting an induction rotor 26 by suitably lubricated bearings (not shown) for relative rotation with respect to stator 23. The excitation for motor 20, best seen in schematic form in FIGURE 2, is achieved by a single-phase main field winding 27 and an auxiliary or starting winding 28 carried in slots provided in the magnetic core of stator 23. These windings are conventionally displaced ninety electrical degrees on the stator core and both are energized during starting conditions. In other words, during the interval required to bring the rotatable assembly (e.g., rotor and shaft) up to a predetermined or the cutout speed of rotation, the windings are excited and cause currents to be induced in the rotor squirrel cage winding, having non-magnetic conductors arranged in rotor slots and short circuited at each end by end rings 25 in the well-known manner.

In the illustrated exemplification of our invention, a winding control switch unit 30 is mounted externally on end frame assembly 22 as by positioning projections 31, formed on one of a pair of switch housings 32, 33, which enter complementary holes in the frame and by screws 34. This unit, to be described more fully hereinafter, cooperates with a speed responsive mechanism 36 to deenergize the start winding after the motor reaches the predetermined speed. In the practice of our invention, as will be appreciated more clearly from a subsequent description of our invention, mechanism 36 may take any suitable form.

By way of example, the illustrated mechanism is constructed in accordance with the disclosure of the James L. Waters Patent No. 3,271,602, issued Sept. 6, 1966, and assigned to the same assignee as the present invention. Briefly described, the mechanism has a centrifugal weight assembly, which is attached to end ring 25 of rotor 26 for rotation with rotor 26 and shaft 24. Assembly is comprised of a push element or collar 39, slidably movable in an axial direction along shaft 24, and a pair of opposing centrifugal weight members 39 supported for pivotal and radial movement on support plate 41 to effect displacement of push collar 38 when the cutout speed is reached. Two coil or tension springs 42 resiliently bias the opposing weight members 39 and urge the push collar 38 toward the standstill position with a preselected force.

Returning now to a consideration of FIGURE 2 and the manner in which the winding control unit 30 is connected in circuit with windings 27 and 28 of this exemplification to effect control of the windings, it will be observed that the unit has two switching devices, only one of which is connected in the winding circuit. In particular, the first switching device generally indicated at 40, is of the single-pole, snap-acting double throw type, and includes a pair of spaced apart fixed or stationary contact terminals 44, 46 finished with contacts in opposed relation. One terminal 44 is connected by lead 47 to one external power line 48 going to a suitable power source of alternating current through a main off-on single-pole, single-throw switch (not shown). The other stationary terminal 46 is in circuit with start winding 28 through conductor 49. A movable contact arm 51 has a movable contact portion 52 at its free end of rapid operation selectively between contact terminals 44, 46 with a snap-action. The anchored end of the movable arm is in circuit with main winding 27 by conductor 53 attached to terminal post 54 and line 48 through leads 56, 57 and a standard start switch 58. Windings 27, 28 are connected in parallel to the other side of an external power line 61 through conductor 62 joined to windings 27, 28, a conventional thermal overload protector device 63, conductor 65, and terminal post 66.

Under starting conditions, the switch components are disposed in the relative positions pictured in FIGURE 2, that is, switch 58 being closed and movable contact portion 52 of arm 51 is being in the closed position with respect to stationary contact terminal 46. Consequently, the main winding 27 will be energized across power lines 48, 61, through terminal posts 54, 66 while the start winding 28 is excited in parallel with the main winding between terminal posts 54, 66 via switch arm 51 and stationary contact terminal 46. Actuation of the switch arm 51 into engagement with stationary contact terminal 44, which is connected in circuit with main winding 28, will disrupt and open the start winding circuit.

In the first exemplification, unit 30 also incorporates a second switching device 70 for controlling an auxiliary circuit which is adapted to be operated during the actuation of the first device. The auxiliary circuit, as shown in FIGURE 2, is open when the motor is energized for starting conditions and may be utilized in the control of electrical components, such as heaters for dishwashers, relays, and the like of the equipment (not shown) in which motor 20 is used. The second switch device 70, as illustrated, is a single-pole, single-throw switch formed with a fixed or stationary contact terminal 71 and a cantilever mounted cooperating flexible spring contact blade or arm 72 secured at the pivot end to a terminal post 73. Leads 74, 76 place the device in circuit with the auxiliary electrical component (not shown).

For operatively connecting the switch devices of unit 30 and push collar 38 together, linkage such as that best revealed in FIGURES 1 and 3 may be utilized. In the illustrated form the linkage has a pivoted switch actuator 77 comprised of a radial portion 78 fabricated at one end with a bifurcated section 79, arranged to straddle shaft 24 for engagement with push collar 38. It is integrally joined at the other end to an axial portion 81 extending through an opening 82 in end frame 22. The axial portion has a raised section 83 in contacting relation to a plunger 84 (FIGURE 1) which, in turn, is suitably connected to actuate the two switching devices 40, 70 of unit 30. Opening 82 is fabricated with a recess 86 (FIGURE 3) which serves as a seat or fulcrum for pivotal movement of actuator 77 and a spring 87 retains the axial portion 81 of the actuator on its fulcrum seat.

By one aspect of our invention, as exemplified in the first embodiment, we provide an improved speed responsive arrangement or system with a net resultant force characteristic such that once the start winding 28 has been de-energized, recycling of the switch devices in unit 30 and of mechanism 36 is effectively and efficiently resisted during brief periods of temporary speed pulsations of rotor 26 as might occur from reverse torques and other possible causes already mentioned. For an understanding of the force characteristics and the beneficial features resulting from out invention, attention is directed to FIGURE 5.

With the mechanism and switch components in the standstill or start positions previously outlined in connection with FIGURE 2 of the first embodiment, the tension springs 42 of mechanism 36 exert a net force on the push collar 38 in the direction of standstill or extended position A while the switch devices of unit 30 and the linkage exert a force against the collar toward the retracted or running position B by the presssure engagement of bifurcated section 79 of the linkage on the radial running face of the collar. When the motor windings 27, 28 are concurrently energized, the rotational speed of shaft 24 and rotor 26 increase until the centrifugal forces acting upon the centrifugal weight members counteracts and overcomes the force of the springs 42 to transfer the collar 38 to position C, the equilibrium or cutout position where the net force on the push collar toward position A has become zero. It should be noted at this time that in FIGURE 5 curve a represents the net force produced on the push collar vs. collar displacement resulting from the bias of the centrifugal mechanism (e.g. springs 42) and the rotation of the rotatable assembly. A representative curve depicting the net force applied on collar 38 by the switch unit 30 and its linkage is revealed by curve b.

Curve d in FIGURE 5 shows the typical net resultant force applied by the speed responsive system of the first embodiment to the push collar 38 of the exemplification and is based upon one of several systems actually constructed in accordance with our invention. It will be observed from curve d that during the travel of collar 38 beyond cutout position C, the net resultant force exerted on the collar 38, primarily due to the switch devices of unit 30, through their connection with the collar (including plunger 84 and switch actuator 77), decreases at a rate substantially less than the rate of spring force decrease during such travel. The present invention provides an unusually sharp resultant force change in the vicinity of position C and beyond that position no further speed change is required to move collar 38 toward the run position. By virtue of the degree of negative slope characteristic and type of non-linearly of the resultant forces shown by curve $d$ to be discussed more fully below, the force toward the run position dramatically increases, directing the collar in that direction in a positive fashion.

At point P, the last switching function occurs in unit 30 (see curve $b$) and an abrupt or sudden increase in the resultant force on collar 38 is provided in a direction toward the running position B. This sudden increase in resultant force allows the motor to decelerate and pulsate to a greater extent than systems presently in use today known to us which do not incorporate our invention. We have determined from actual practice that, generally speaking, the greater the resultant force change exerted on collar 38 in the running direction from a time before switching occurs until the last switching function has been completed, the better the performance for the over-all system. The magnitude and degree of slope of the resultant force on collar 38 toward the running position, evidenced by curve $d$, discourage or retard the tendency of the collar to move in the opposite or standstill direction.

For best results in the system of our invention, it is desirable to provide an axial clearance between push collar 38 and bifurcated section 39 of actuator 77. Consequently, when the collar and actuator are disengaged at point E, the only forces on the collar result from the net force of curve $a$ and the two curves $a$ and $d$ coincide at that location. This arrangement permits axial movement of collar 38 in the standstill direction during operation before it makes contact with the actuator, further reducing the speed pulsation sensitivity of the system while also preventing the potential generation of noise during running conditions. In addition, wear between the collar and actuator section 79 is minimized. To achieve this clearance, axial section 85 is bent toward end frame housing 35 so that when collar 38 is located at position E, section 85 makes contact with the housing and further pivotal movement of actuator 77 and extension of plunger 84 are prevented.

The lack of sensitivity to temporary speed pulsations of our improved speed responsive system and other benefits may be better appreciated by a comparison of the first embodiment of our invention with conventional systems. In order to aid in the comparison, it will be assumed that the conventional system incorporates the same centrifugal mechanism 36 illustrated in connection with the first embodiment of our invention. The broken line curve denoted by letter $e$ shows the net force on collar 38 resulting from the type of switch unit and linkage illustrated in U.S. Patents No. 2,149,108 of A. F. Welch, granted Feb. 28, 1939, and No. 2,243,577, issued to C. P. Pepper on May 27, 1941. This force is high at standstill and progressively decreases in a substantially linear manner through and beyond the switching point P, that is, the force gradually increases in the standstill direction in the vicinity of point P rather than toward the desired running position. Broken line curve $f$ illustrates the resultant force of the example system on collar 38 which is also essentially linear between the cutout position C and the running position B. As collar 38 moves toward the running position B, through the switching point P where the switch is operating, the start winding is taken out of circuit thereby causing a momentary reduction in motor speed. This, in turn, produces a decrease in centrifugal force on the collar which tends to recycle the system, especially in view of the overall linearity and general slope of curve $f$. Moreover, a direct comparison of the slopes for curves $d$ and $f$ shows that the slope of curve $d$ is far greater than that of curve $f$, particularly in the regions beyond cutout C and in the vicinity of switching point P, evidencing a large force change in the desired direction for a system incorporating the present invention.

Turning now to FIGURES 1, 6–13, inclusive, we have illustrated in detail one type of switch unit 30 which may be advantageously incorporated into the speed responsive system of the first embodiment discussed above. This unit, including its switching devices, was originally disclosed and claimed in the copending patent application Ser. No. 281,938 of John L. Slonneger, filed May 21, 1963, now abandoned in view of the continuation-in-part application which issued into U.S. Patent No. 3,293,388 on Dec. 20, 1966.

As illustrated, the switching devices are mounted within suitable facing recesses provided in housing members 32, 33, held together in assembled relation by means of their cooperation with individual terminals which project through appropriate slots formed in housing end walls 91, 92. As best shown in FIGURE 6, the housing members provide unit 30 with a generally box-shaped and elongated external configuration when assembled together.

Stationary contact terminals 44, 46, and 71 of unit 30 are each thin and elongated in construction, each including a pair of spaced apart and spade-like coplanar tab sections 93, 94 best shown in FIGURES 10–12. Tab sections 93, 94 extend outwardly from the end 91 of the unit for quick assembly with a pair of complementary quick-connecting female terminals of leads 47, 49 and 74 respectively (FIGURE 2). Each pair of the tab sections is integrally joined to a contact supporting platform 96 which is parallel to but offset slightly from its associated pair of tab sections (FIGS. 7, 8, and 10). The platforms are in spaced apart parallel relationship and in vertical alignment. In regard to stationary contact terminals 44, 46, they have spaced apart fixed contacts 97, 98 secured to the opposed faces of their respective platforms 96 (FIGS. 7, 9, 10) such that the contacts face each other to form part of single-pole, double-throw, snap-acting switch device 40. A fixed contact 99, secured to its platform, faces upwardly (as viewed in FIGURES 7 and 9) to form part of the stationary contact terminal 71 for single-pole, single-throw, switch device 70.

With respect to the form of terminal posts 54, 66, and 73 (shown variously in FIGURES 7 and 9–12), each includes a pair of tab sections 101, 102, identical in configuration to those for the stationary contact terminals which extend through appropriate slots and outwardly from housing end 92 in vertical alignment for quick-connection to female terminals of leads 53, 57, 61, 65, and 76 (shown in FIGURE 2). Terminal posts 54 and 73 serve to mount the movable arms for the respective switching devices and include platforms 103 made coplanar and integral with their tab sections for this purpose. Post 66, on the other hand, is a conveniently located dummy terminal and is employed as the connection for electrically joining winding lead 65 to line 61. Thus, there is no need for furnishing that post with a platform.

Considering the construction of movable arm 51 for switch device 40, and in particular, FIGURES 7, 9, 10 and 11, arm 51 is fabricated from flexible material, capable of carrying electrical current. Its one end is secured, as by rivets 106, to platform 103 so that it is supported in a cantilever fashion while its free end carries double sided movable contact 52 arranged for selective cooperation with opposed fixed contacts 97, 98. Intermediate its ends, arm 51 is slotted, best shown in FIGURES 10 and 11, so as to provide a central tongue 108 disposed between a pair of elongated leg sections 109, 111.

Snap action is imparted to contact 52 alternately for rapid selective transfer between fixed contacts 97, 98 by a toggle spring mechanism 112 (FIGURE 10) having a supporting portion 113 attached by the rivets 106 to platform 103 of terminal post 54, which also functions to mount arm 51. A bowed or generally U-shaped curved portion 114 of spring 112 has its free end 115 pivotally connected to tongue 108 by a slot and projection, indicated at numeral 116 in FIGURE 10. Curve portion 114 is maintained under compression between portion 113 and movable arm tongue 108 to provide an over-center type snap-action operation, i.e., rapid making and breaking action in either direction of movement for movable contact 52. The cooperative relation between device 70 and plunger 84 will be described after the illustrated construction of switch device 40, a single-pole, single-throw device, has been reviewed.

Referring now to FIGURES 7, 9, and 10 in particular, the movable arm 72 of device 40 is formed from a generally rectangular piece of flexible material, adapted to carry current, having one end section 121 secured to the platform 103 of terminal post 73 by a riveted connection 122. The free end of the cantilever mounted arm carries a movable contact 123 which overlies and is normally biased by flexible arm 72 toward its associated fixed contact 99 (FIGURES 7 and 9).

For connecting switch devices 40 and 70 in cooperative relation with respect to the push collar 38 and to achieve the desired interaction between the switch devices and the push collar in the manner already discussed, plunger 84 is arranged to reciprocate between depressed and extended positions revealed in FIGURES 7 and 9 respectively. As shown in FIGURE 8, plunger 84 is molded of cured insulating material and includes an upper section 126 (as viewed in the drawings) adapted to engage the bottom of curved spring portion 114 in switch device 40. Central body section 127 of the plunger is furnished with a tapered channel 128 dimensionally greater at its smallest cross-section than arm 72 of device 70 to receive the arm in actuating, lost motion, relation. The lower end of the plunger projects through a complementary opening 129 in housing 32 for engagement with axial section 85 of actuator 77.

In order to guide the plunger between its extended and depressed positions, a pair of opposed recesses 131 are molded into opposite sides of body section 127 which receive a pair of inwardly facing molded projections 132 (FIGURE 7) formed in body member 32. The projections are adapted to make alternate contact with the end walls 133 and 134 of the recesses 131 to limit and control the total possible reciprocating movement of the plunger 84. However, in the first exemplification of motor 20 it will be recalled that portion 85 of actuator 77 is utilized to determine and control the extended position of the plunger. Thus, in the present exemplification, walls 134 do not contact the associated projections 132 for that purpose. For preventing undesirable lateral movement of plunger 85, that is, movement of the plunger in directions transverse to the axis of its reciprocation, the opposed plunger surfaces 136 are fitted into a recessed channel 137 (FIGURE 7) provided on the inner recessed side of body member 32 and the external rectangular portion of the plunger is retained in its complementary opening 129 of the housing 32 (see FIGURE 8).

During starting conditions for motor 20 of the exemplification, plunger 84 will be depressed as shown in FIGURE 7, with both devices 40 and 70 applying an initial bias on the plunger in the direction of the arrows. The net force exerted on the push collar by these devices and the linkage will be in a direction opposing springs 42 of mechanism 36 which hold the collar in its standstill position A (note curves b and d in FIGURE 5). Bowed portion 114 of device 40 bears downwardly against plunger surface 126 as lower lip 141 of channel 128 holds spring arm 72 of switch device 70 away from fixed contact 99 to provide the bias on the plunger. When the rotational speed of motor 20 is sufficiently high and reaches "cutout," the push collar will travel toward its running position b and by virtue of springs 114, 72, and 87, section 79 of actuator 77 will exert force depicted by curve b in FIGURE 5 on the running face of collar 38. The net force applied on the plunger 84 dry devices 40, 70 as the plunger is transferred between its depressed and extended positions is shown by representative curve g in FIGURE 13. As the plunger moves to switching point P in the direction of the arrows, the initial force supplied by springs 114 and 72 on the plunger gradually tapers off until the tongue 108 and leg sections 109, 111 of arm 51 are side by side and portion 52 is snapped into engagement with fixed contact 97. During this switching operation, spring 109 is primarily responsible for a rapd or abrupt increase, in the net force being applied on the plunger, indicated by numeral 140 in FIGURE 13, which is transmitted to collar 38 in the running direction through actuator 77. Broken line curve h in FIGURE 13 is a plunger displacement force diagram illutsrating the force on plunger 84 resulting from switch device 40. Curves g and h clearly reveal that the principal force exerted on the plunger by devices 40 and 70 is attributable to device 40.

FIGURE 9 illustrates certain components of the speed responsive system for motor 20 of the exemplification in the running position, with plunger 84 in its extended position. Preferably, axial section 85 of actuator is adjusted relative to raised section 83 and end frame housing 25 so that after device 70 closes, upper lip 142 of plunger channel 128 continues to move downwardly to bow spring arm 72 in the illustrated manner. This resiliently maintains the contacts in the closed position and serves several purpoes. It not only insures firm engagement between contacts 99, 123, but additionally slightly reduces the net force being exerted on the plunger as it approaches its extended position thereby affording a cushioning effect on the plunger.

When collar 38 is transferred from position B to position A, actuator 77 will pivot and initiate reciprocation of plunger 84 from its extended position (FIGURE 9) upwardly toward the depressed position (FIGURE 9). As the plunger moves upwardly, the enlarged cross section dimension between lips 141 and 142 of channel 128 permits lost motion for the plunger, thereby gaining momentum before lip 141 makes contact with the bottom of spring arm 72. Positive separation of contacts 99, 123 is achieved and the possibility of a welding condition for the contacts is minimized. Continued upward travel of the plunger will oppose the increasing bias of movable spring arm 72. When the over-center point for arm 51 is reached for switching device 40, movable contact portion 52 is thrown with a snap-action into engagement with contact 98 of contact terminal 46. The net forces imparted to the plunger 84 during its return from the extended to the depressed positions is respectively shown in FIGURE 13 as the bottom broken line in curve h for device 40 and for the combination of devices 40 and 70 by the bottom solid line of curve g.

Having reference now to FIGURES 14 through 17 inclusive, our invention is applied in a second embodiment to a multi-speed dynamoelectric machine which incorporates the same speed responsive mechanism 36 and mechanical linkage, including actuator 77 and plunger 84, already outlined in connection with the first embodiment. Consequently, in the FIGURES 14 through 17 inclusive, like reference numerals designate identical parts previously described with regard to the other figures. In the second exemplification, schematically illustrated in FIGURE 14, the dynamoelectric machine is a two speed, single phase induction motor having a first main field winding 151 to provide an even number of running poles, such as four, for high speed operation. A second main field winding 152 is wound to provide a greater number of poles than that for winding 152, such as six running poles for low speed operation, and a start winding 153 is furnished with the same number of poles as the first main field winding 151.

In the second exemplification of our invention, winding control unit, identified generally by numeral 150 in FIGURE 14, includes two switching devices operatively connected in the winding circuits. The first switching device 40 is identical in construction to that outlined for the first embodiment, having its stationary contact terminal 44 connected by lead 156 to one side of the second main winding 152. Its other stationary contact terminal 46 is in circuit with the one side of main winding 151 by conductor 157 and mounts a lead 158 connecting the terminal to the high speed side 159 of a standard single-pole, double-throw, manually operated speed selector switch 160. The selector arm 165 of the switch is in turn attached to line 173 of a suitable source of alternate power. Terminal post 54, which is in circuit with the movable snap-acting contact arm 51 of device 40, serially connects the arm to the low speed side 161 of the speed selector switch 160 through lead 162.

The second switching device 170 has its movable contact arm 171 connected in series with the low speed side 161 of speed selector switch 160 through terminal post 54 and lead 162. Its single stationary contact terminal 71 is placed in circuit with the start winding 153 by lead 164. The other sides of each of the three windings are commonly joined together at connection 167 and connected to one side of alternating current power lead 168 through leads 169, 172 and terminal post 66 carried by unit 150.

The relative positions of certain components for the speed responsive system of the example two speed motor are illustrated in FIGURE 14 under standstill or starting conditions, with speed selector switch 160 set for low speed operation. Main windings 151 and start winding 153 are initially energized in parallel across lines 173, 168. More specifically, main field winding 151 is excited through the low speed side 161 of switch 160, terminal post 54, snap acting arm 51, stationary contact terminal post 46, lead 157 and then through terminal post 66 to line 168. The start winding 153 is excited in parallel to winding 151 from terminal post 54, through arm 171 of switch 170 and the stationary contact terminal 71 and, finally, to line 168 through terminal post 66.

Switch devices 40 and 171, along with the linkage which connects these devices to element 38, exert a force pattern on the push collar basically similar to that shown by curve b of the first exemplification except that the curve is slightly modified in view of switch device 170. However, in view of the predominant force characteristics supplied by switch 40, the modification will not be too great and curve d in FIGURE 5 will therefore be representative of the net resultant forces of the speed responsive system for the second embodiment.

Returning to the operation of the speed responsive system in the second embodiment, once the speed of rotation for rotor 26 and mechanism 36 reaches the "cutout" speed, the push collar will be transferred beyond position C through switching point P and finally driven in a positive manner toward its running position B. In the vicinity of switching point P plunger 84 will move toward its extended position (downwardly in FIGURE 14), opening the contacts of switch 170 while movable portion 52 of device 40 is rapidly moved by a snap action into engagement with stationary contact terminal 44. Thus, with switch 170 in the open position, the start winding 153 will be deenergized. In addition, the main winding 151 becomes deenergized in view of the open circuit at stationary contact terminal 46 and the other main winding 152 will be placed in circuit through the engagement of movable arm portion 52 and the upper stationary contact terminal 44 to provide a low speed of operation for the motor, e.g. approximately 1200 r.p.m. for six poles.

For high speed operation, that is, with the selector switch 160 closing high speed side 159 (shown by the broken lines in FIGURE 14), main winding 151 and start winding 153 will once again be energized in parallel during starting when switch devices 40 and 170 assume the relative positions seen in FIGURE 14. A closed path is provided for the main field winding 151 through lead 158, stationary contact terminal 46, lead 157 to connection 167, and then to line 168 through terminal post 66. The circuit of the start winding passes through stationary terminal post 46 and contact portion 52 of snap-acting arm 51, then through the closed contacts of switch 170, lead 164 to connection 167. The other main winding 152, being connected to the open stationary contact terminal 44 will be in open circuit and therefore not energized.

When the speed responsive system reaches switching point P (FIGURE 5), for reasons already given the plunger 84 will be moving toward its extended position, opening switch 170. After movable contact portion 52 of switch 40 is operated into engagement with stationary contact terminal 44, main field winding 152 will still be deenergized in view of open side 161 of selector switch 160. However, even though switch portion 52 is in engagement with the upper stationary contact terminal 44, main field winding 151 will still be energized through leads 157 and 158 and the intermediate stationary contact terminal 46 to provide a high speed running operation for the motor. Consequently, at no time is winding 151 in open circuit during high speed starting and running operation, reducing the potential introduction of reverse torques in the motor as the start winding is being taken out of the circuit by the relatively slow operation of device 170.

FIGURES 15 and 16 illustrate the details of a specific winding control switch unit 150 which may be employed in the second embodiment of our invention. The unit is also disclosed and claimed in the continuation-in-part application which issued into U.S. Patent No. 3,293,388 on Dec. 20, 1966 of John L. Slonneger. It is essentially the same structure in detail as unit 30, differentiating therefrom primarily in the construction and operation of the lower switch device 170 as viewed in the drawings. Flexible arm 171 is somewhat Z shaped, formed by three integral sections 176, 177, and 178 capable of conducting current. Section 176 is mounted by rivets 179 onto the bottom surface of platform 103 of the upper terminal post 54, which also serves as the support for switch arm 51 of device 40, such that section 177 depends downwardly in a vertical direction. The free end of section 178 carries an upwardly facing contact 181 which is normally urged toward downwardly facing contact 99 of the lower stationary contact terminal 71. Intermediate vertical section 177 of arm 171 and contact 181, flexible section 178 fits within channel 128 of plunger 84 for activation thereby.

Assuming the plunger 84 is in its depressed position (solid lines in FIGURE 15), preferably bottom lip 141 forces movable contact 181 into firm engagement with fixed contact 99, putting pressure on flexible section 178 in opposition to the travel of the plunger itself. This interrelationship produces a cushioning effect on plunger 84 as it is being driven into its depressed position and assures a good electrical connection between the closed contacts.

When the collar 38 of mechanism 36 is being transferred to the running position B, the forces initially supplied on the plunger 84 by unit 150 drive the plunger toward its extended position. After relatively little downward movement of the plunger away from its depressed position, there is lost motion permitted between the arm 171 and the plunger, resulting from the enlarged dimension between tips 141, 142 of channel 128, and upper tip 142 moves into engagement with the top surface of flexible section 178 for opening device 170. Since arm 171 is being moved in opposition to its normally closed position, the force on the plunger resulting from arm 171 gradually increases in a direction opposing movement of the plunger. This interaction produces a cushioning effect on the plunger as it travels into its extended position. The interaction of device 40 and plunger 84 has already been outlined in connection with the first exemplification of our invention.

Curve *j* in FIGURE 17 shows the net force applied to the plunger 84 by unit 150 as the plunger is transferred between the depressed and extended positions, the curve being based on a switch unit actually constructed in accordance with that pictured in FIGURES 15 and 16. Numeral 180 denotes the region of switching operation for the devices. For all curves *g* (FIGURE 13), *j* and *h*, the sharp drop in the net force on the plunger in the region of its extended position is caused by the limit being placed on plunger travel either by wall 134 of the plunger or by actuator 77. A comparison of curve *j*, which is the net force characteristic applied on the plunger by unit 150, with curve *h* (the effect of device 170 being removed), demonstrates the predominant force characteristics in the net force pattern 35 upon plunger 84 resulting from switch device 40.

In summary, a dynamoelectric machine when involving a single-speed or multi-speed application which incorporates the speed responsive system of our invention is capable of effectively and efficiently resisting recycling of the centrifugal mechanism and winding control switching unit. Further, the system is less sensitive to reverse torques and motor pulsations which might be encountered during motor operation and the motor is permitted to decrease in speed to a greater extent without recurring recycling of the system than other constructions known to us. These advantages and features are obtained with an inexpensive system that is capable of long operating life without producing objectionable switching and mechanism noises.

While we have shown and described what is considered to be the preferred two embodiments of our invention in accordance with the patent statutes, it will be obvious to those skilled in the art that changes and modifications may be made in the disclosed structure without departing from our invention, and it is, therefore, aimed in the appended claims to cover all such changes and modifications as fall within the true spirit and scope of our invention.

What we claim as new and desire to secure by Letters Patent of the United States is:

1. In a dynamoelectric machine having at least two windings, a speed responsive arrangement for controlling the winding circuit including a rotatable assembly; a mechanism responsive to the rotational speed of said assembly having an element axially movable between standstill and running positions, and having a cutout position, said mechanism further having spring means urging said element toward the standstill position; switch means for controlling the winding circuit of the dynamoelectric machine mounted in cooperative relation to said element; said switch means including at least one pair of switch contacts connected in circuit with one of the windings and having a spring biased snap-acting contact arm operable between closed and open contact positions, actuator link means operatively connecting said axially movable element and snap-acting switch arm together; said switch means exerting a net force on said element through said link means in a direction opposing the spring means during the greater part of the axial movement of said element, with the net force exerted by said switch means on said element decreasing at a rate less than the rate of force decrease applied on said element by said spring means as the element travels beyond the cutout position toward the running position, and with the net resultant force exerted on said element being primarily non-linear during such travel; said switch means and link means producing an abrupt increase in the net resultant force on the element in the direction of said running position during operation of said switch arm whereby said arrangement effects positive movement of said element beyond said cutout position and toward said running position without requiring an increase in rotational speed of said rotatable assembly and resists recycling of said element and switch means during periods of temporary machine speed pulsations once said element has reached said running position.

2. In a dynamoelectric machine having at least two windings; a rotatable assembly; a speed responsive system for controlling the winding circuit including a mechanism responsive to the rotational speed of said assembly having an element axially movable between first and second positions, and having a cutout position therebetween; switch means for controlling the winding circuit of the dynamoelectric machine mounted in cooperative relation to said element; said switch means including at least one pair of switch contacts connected in circuit with one of the windings and having a spring biased rapid-acting arm operable between closed and open contact positions, actuator link means operatively connecting said axially movable element and rapid-acting switch arm together; means for producing transfer of said element between said first and second positions including said switch means and link means; said switch means and link means exerting a net force on said element which decreases at a rate less than the rate of force decrease exerted on said element by other force means as the element travels from the cutout position toward the second position, said speed responsive system producing a sudden increase in the net resultant force on the element in the direction of the second position during the rapid operation of said switch arm whereby recycling of said element and switch means is resisted by the speed responsive system during periods of temporary speed pulsations once said element approaches said second position.

3. A dynamoelectric machine comprising more than one winding; a rotatable assembly; and a speed responsive arrangement for controlling the winding circuit of at least one of the windings including a mechanism responsive to the rotational speed of said assembly having a push collar axially movable between standstill and running positions, and biasing means urging said collar toward the standstill position, a first switch device having a stationary contact terminal in circuit with said one winding and a first movable contact arm operable between first and second contact positions relative to said stationary contact terminal, a second switch device including a stationary contact terminal and a second movable contact arm operable into and out of engagement with said stationary contact terminal of said second switch device for controlling a second circuit, link means operatively connecting together said first and second movable switch arms and said collar, for exerting a net force on said collar toward the running position during at least a part of the axial movement of said collar with the speed responsive arrangement producing an abrupt increase in the resultant force on the collar in the direction of the running position during operation of said two contact arms whereby once said collar approaches said running position, recycling of said collar and switch devices is impeded by the speed responsive arrangement when the rotatable assembly is subjected to temporary periods of speed pulsations.

4. A dynamoelectric machine comprising a main field winding and a start winding; a rotatable assembly; a speed responsive system for controlling the winding circuit of at least said start winding including a mechanism responsive to the rotational speed of said assembly having an element axially movable between first and second positions; a first switch device having a stationary contact terminal in circuit with said start winding and a first movable contact arm operable between closed and open contact positions relative to said stationary contact terminal; spring means connected to said movable contact arm imparting a snap action of said arm between said contact positions; a second switch device including a stationary contact terminal controlling an auxiliary circuit externally to said winding, and a second movable contact arm operable into and out of engagement with its associated stationary contact terminal; link means operatively connecting together said first and second movable switch arms and said element for exerting a net force on said element toward its second position during at least a part of the axial movement to said element, with said switch devices and link means having a combined net force characteristic for producing an abrupt increase in the resultant force on the element in the direction of the second position during operation of said first and second contact arms whereby once said element approaches said second position, recycling of said element and switch devices is impeded by the speed responsive system when the rotatable assembly is subjected to temporary periods of speed pulsations.

5. A dynamoelectric machine comprising at least first and second main field windings to provide at least two running speeds and a start winding; a rotatable assembly; and a speed responsive system for controlling the circuit of said windings during operation of said machine including a mechanism responsive to the rotational speed of said assembly; said mechanism having an element movable between standstill and running positions, a first switch device having a stationary contact terminal in circuit with said first main field winding and a second stationary contact terminal in circuit with said second main field winding, a movable contact arm selectively operable between said first and second stationary contact terminals with a snap action therebetween; a second switch device including a stationary contact terminal in series circuit with said start winding and a movable contact arm operable into and out of engagement with its associated stationary contact terminal; the movable contact arm of said first device being in engagement with said first stationary contact terminal and said movable contact arm of said second switch device being in engagement with its associated stationary contact terminal when said element is in its standstill position thereby concurrently energizing said first main winding and said start winding during starting conditions for all speeds of machine operation; link means operatively connecting together said first and second movable switch arms and said element for exerting a net force on said element toward the running position during at least a part of the axial movement of said element, with said switch devices and link means having a combined net force characteristic for producing an abrupt increase in the resultant force on the element in the direction of the running position during operation of said movable contact arms, whereby once said element approaches said running positon, recycling of said element and switch devices is impeded by the speed responsive system when the rotatable assembly is subjected to temporary speed pulsations.

6. A dynamoelectric machine comprising a rotor mounted to a shaft, a stator having first and second windings and a speed responsive system for controlling the winding circuit of at least the first winding including a mechanism mounted to rotate with said shaft and being responsive to the rotational speed of said shaft, said mechanism having an element axially movable along said shaft between standstill and running positions, biasing means urging said element toward the standstill position; and centrifugal means carried by said mechanism overcoming said biasing means at a cutout position and driving said element toward said running position; switch means including at least one switch device mounted in cooperative relation to said element; said device including a stationary contact terminal in circuit with said first winding and a movable contact arm operable between closed and open positions relative to said terminal to control the energization of said first winding; spring means connected to said contact arm to impart a quick action thereto for moving the arm rapidly between said contact positions; actuator link means operatively connecting said axially movable element and switch means together for exerting a force on said element toward the running position during a portion but not all of the axial movement of said element, with the net force exerted by said switch means and link means decreasing at a rate less than the rate of force decrease exerted on said element by said biasing means as the element travels from the cutout toward the running positions, with the resultant force exerted on said element being non-linear for the greater portion of such travel, and with said switch means and link means being effective to produce an abrupt increase in the resultant net force on the element in the direction of the run position during operation of said switch means, whereby positive transfer of said element beyond said cutout position toward said running position is attained without requiring an increase in rotational speed of said rotatable assembly and the effect of transient speed pulsations tending to cause recycling of said element and switch means is reduced by said speed responsive system once said element has traveled beyond the cutout position in the direction of the running position.

7. A dynamoelectric machine comprising at least low speed and higher speed main field windings to provide at least two running speeds and a start winding; a speed selector switch having at least a low speed side and a higher speed side; a rotatable assembly; and a speed responsive system for controlling the circuit of said windings during operation of said machine including a mechanism responsive to the rotational speed of said assembly including an element movable between starting and running positions, a first switch device having a first stationary contact terminal in circuit with said higher speed main field winding, a second stationary contact terminal in circuit with said low speed main field winding and with said higher speed side of said selector switch, and a movable contact arm selectively operable between said first and second stationary contact terminals with a snap action therebetween; said contact arm being serially connected to said low speed side of said speed selector switch; a second switch device including a stationary contact terminal in series circuit with said start winding, and movable contact arm in circuit with said low speed side of said speed selector switch and in normally closed relation to its associated stationary contact terminal; the snap-acting movable contact arm of said first device being in engagement with said first stationary contact terminal and said movable contact arm of said second switch device being in engagement with its associated stationary contact terminal when said element is in its starting position thereby concurrently energizing said higher speed main winding and said start winding during starting conditions for all speeds of machine operation; link means operatively connecting together said first and second movable switch arms and said element for producing an abrupt increase in the resultant force on the element in the direction of the running position when said snap-acting movable arm is operated into engagement with said second stationary contact terminal of said first switch and said movable contact arm of said second switch device is operated away from the normal position thereby opening said starting winding; said low speed main winding being energized through said second stationary contact terminal of said first switch device when the low speed side of said speed selector switch and said snap-acting arm and second stationary contact terminal are in closed circuit.

8. A dynamoelectric machine comprising at least two windings adapted for excitation from a power source; a rotatable assembly; a speed responsive system for controlling the winding circuit of at least one winding including a mechanism responsive to the rotational speed of said assembly having an element axially movable between first and second positions and having biasing means urging the element toward the first position; a switch unit carried by the machine including a housing accommodating first and second switch devices; said first switch device having a first stationary contact means connected in circuit with one side of one of said windings, a second stationary contact means connectable to one side of the power source, and a movable contact means selectively engageable with said first and second stationary contact means; said movable contact means being connectable to the one side of the power source; at least two windings having their other sides connected in circuit with one another and connectable to another side of the power source; said second switch device including a stationary contact means and a movable contact means associated therewith for controlling another circuit; link means operatively connecting together the movable contact means with said axially movable element; said link means including a switch actuator slidably mounted by said housing for movement between depressed and extended positions; said actuator being in actuating engagement with said movable contact means of said switch device, with the movable contact means of the first switch device being in engagement with the first stationary contact to close the circuit of at least one of said windings when the actuator is in the depressed position; spring means disposed within the housing for biasing the actuator toward the extended position, and for exerting a net force on said element in opposition to the biasing means of said mechanism when said element is in said first position; and said biasing means exerting a greater force on said element than said spring means to maintain the element in that position and the actuator in its depressed position.

9. The dynamoelectric machine of claim 8 in which movable contact means of said second switch device is connected in parallel within said switch housing with the movable contact means of said first switch device and said movable contact means exert a net force on the actuator in the direction toward its extended position as the actuator moves from the depressed toward the extended position.

10. A dynamoelectric machine comprising at least first and second windings adapted for excitation from a power source; a rotatable assembly; a speed responsive system for controlling the winding circuit of at least said first winding including a mechanism responsive to the rotational speed of said assembly having an element axially movable between first and second positions and having biasing means urging the element toward the first position; a switch unit carried by the machine including a housing accommodating first and second switch devices; said first switch device having a first stationary contact means connected in circuit with one side of said first winding, a second stationary contact means connectable to one side of the power source, and a movable contact means selectively engageable with said first and second stationary contact means; said movable contact means being connected in series circuit with one side of said second winding and connectable to the one side of the power source; the first and second windings having their other sides connected in parallel with one another and connectable to another side of the power source; said second switch device including a stationary contact means and a movable contact means associated therewith for controlling an auxiliary circuit externally to said winding; link means operatively connecting together the movable contact means with said axially movable element; said link means including a switch actuator slidably mounted by said housing for movement between depressed and extended positions; said actuator being in actuating engagement with said movable contact means of said switch device, with the movable contact means of the first switch device being in engagement with the first stationary contact to close the circuit of said first and second windings when the actuator is in the depressed position, and with the movable contact means of said first switch device being in engagement with the second stationary contact means when the actuator is in the extended position to open the circuit of the first winding; spring means disposed within the housing for biasing the actuator toward the extended position, and for exerting a net force on said element in opposition to the biasing means of said mechanism when said element is in said first position; said biasing means exerting a greater force on said element than said spring means to maintain the element in that position and the actuator in its depressed position.

11. The dynamoelectric machine of claim 8 in which movable contact means of said first and second switch devices exert biases on said actuator when in its depressed position in a direction toward its extended position, and the actuator maintains the movable and stationary contact means of said second switch device out of engagement when the actuator is in its depressed position.

References Cited

UNITED STATES PATENTS

| | | |
|---|---|---|
| 1,926,339 | 9/1933 | Kindl et al. |
| 2,394,283 | 2/1946 | Yost. |
| 2,519,297 | 8/1950 | Stump et al. |
| 2,583,590 | 1/1952 | Osterhus. |
| 2,840,772 | 6/1958 | Seely _____ 318—225 X |
| 2,921,160 | 1/1960 | Lautzenhiser. |
| 3,167,700 | 1/1965 | Neyhouse _____ 318—225 X |
| 3,187,132 | 6/1965 | Dennison _____ 200—67 |
| 3,187,136 | 6/1965 | Gorder et al. _____ 200—67 |
| 3,293,388 | 12/1966 | Slonneger. |

ORIS L. RADER, *Primary Examiner.*

G. Z. RUBINSON, *Assistant Examiner.*